US011575340B2

(12) United States Patent
Reith et al.

(10) Patent No.: US 11,575,340 B2
(45) Date of Patent: Feb. 7, 2023

(54) METHOD FOR CONTINUOUS CONDITION MONITORING OF AN ELECTRIC MOTOR

(71) Applicant: Schaeffler Technologies AG & Co. KG, Herzogenaurach (DE)

(72) Inventors: Jochen Reith, Bühl (DE); Tom Huck, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/295,463

(22) PCT Filed: Nov. 20, 2019

(86) PCT No.: PCT/DE2019/100991
§ 371 (c)(1),
(2) Date: May 20, 2021

(87) PCT Pub. No.: WO2020/108693
PCT Pub. Date: Jun. 4, 2020

(65) Prior Publication Data
US 2021/0391819 A1  Dec. 16, 2021

(30) Foreign Application Priority Data

Nov. 30, 2018 (DE) .......................... 102018130495.1

(51) Int. Cl.
*H02P 29/64* (2016.01)
*H02H 3/08* (2006.01)
(52) U.S. Cl.
CPC .................................. *H02P 29/64* (2016.02)
(58) Field of Classification Search
CPC .................................. H02P 29/64; H02P 29/60
See application file for complete search history.

(56) References Cited

U.S. PATENT DOCUMENTS 8,487,575 B2 * 7/2013 Yeh ........................ H02P 29/664
  318/432
9,496,817 B1 * 11/2016 Lepka ..................... H02P 29/67
  (Continued)

FOREIGN PATENT DOCUMENTS

DE   19602006 A1   8/1996
DE   19723393 A1   12/1997
  (Continued)

OTHER PUBLICATIONS

Author: P. Milanfar et al Title: Monitoring the thermal condition of permanent-magnet synchronous motors; vol. 32, No. 4 Date: Oct. 1996.

*Primary Examiner* — Said Bouziane

(57) ABSTRACT

A method for continuous condition monitoring of an electric motor having a rotor and a stator and at least two motor phases, wherein, a first energy loss is associated with the first motor phase and a second energy loss is associated with the second motor phase. The temperature during operation of the electric motor is determined by firstly carrying out a first temperature calculation in order to estimate a temperature of the first motor phase, the first temperature calculation incorporating an energy loss estimation, and a temperature estimation in which a temperature of the first motor phase depends on the estimated energy loss. A second temperature calculation in order to estimate a temperature of the second motor phase utilizes the first temperature value and an energy loss difference between the first and the second energy loss.

16 Claims, 2 Drawing Sheets

(56) References Cited

U.S. PATENT DOCUMENTS

| | | | | |
|---|---|---|---|---|
| 2009/0189561 A1* | 7/2009 | Patel | .................... | H02H 7/0852 |
| | | | | 310/680 |
| 2011/0050141 A1* | 3/2011 | Yeh | ....................... | H02P 29/664 |
| | | | | 318/434 |
| 2011/0084638 A1* | 4/2011 | Patel | ........................ | H02P 6/18 |
| | | | | 318/473 |
| 2011/0279074 A1* | 11/2011 | Yeh | ........................ | G01K 13/08 |
| | | | | 318/473 |

FOREIGN PATENT DOCUMENTS

| | | | |
|---|---|---|---|
| DE | 10155459 | A1 | 5/2002 |
| DE | 102004006730 | A1 | 8/2004 |
| DE | 102005061080 | A1 | 7/2006 |
| DE | 102009005372 | A1 | 10/2009 |
| DE | 102009025390 | | 1/2010 |
| DE | 102010041944 | A1 | 5/2011 |
| DE | 102011075605 | | 3/2012 |
| DE | 102011085750 | A1 | 5/2012 |
| DE | 102014216310 | A1 | 2/2016 |
| JP | H0654572 | A | 2/1994 |
| WO | 2015110107 | A2 | 7/2015 |
| WO | 2016157382 | | 10/2016 |

* cited by examiner

METHOD FOR CONTINUOUS CONDITION MONITORING OF AN ELECTRIC MOTOR

CROSS-REFERENCE TO RELATED APPLICATIONS

This application is the U.S. National Phase of PCT Appln. No. PCT/DE2019/100991 filed Nov. 20, 2019, which claims priority to DE 102018130495.1 filed Nov. 30, 2018, the entire disclosures of which are incorporated by reference herein.

TECHNICAL FIELD

The disclosure relates to a method for continuous condition monitoring of an electric motor.

BACKGROUND

DE 10 2010 041 944 A1 describes an electric motor with sensorless temperature measurement. An estimation module receives a temperature value and the three phase current values of the three-phase electric motor and processes this information into an estimated motor temperature.

WO 2015/110107 A2 describes a method for determining a motor temperature of an electric motor, in which the motor temperature is estimated using a motor temperature model dependent on a temperature of the power electronics controlling the electric motor.

DE 10 2010 038 560 A1 describes a temperature estimation method in order to estimate the stator winding temperature via a thermal impedance model, the engine speed and a measured engine cooling temperature. The total power loss is determined for each phase of the motor. The stator winding temperatures for each motor phase are estimated based on the total power loss in that phase and a combined thermal impedance for that phase. The combined thermal impedance includes a first thermal impedance between the stator winding and the stator core and a second thermal impedance between the stator core and the engine coolant.

SUMMARY

It is desirable to improve a temperature determination in an electric motor such that the temperature in an electric motor with asymmetrical phase power can be estimated easily and reliably.

A method for continuous condition monitoring of an electric motor is proposed. The motor has a rotor and a stator and at least two motor phases for inducing a rotary motion of the rotor relative to the stator. In one operating mode of the electric motor, a first energy loss is associated with the first motor phase and a second energy loss is associated with the second motor phase. The temperature determination during operation of the electric motor is carried out by firstly carrying out a first temperature calculation in order to estimate a temperature of the first motor phase, the first temperature calculation incorporating an energy loss estimation, in which at least one first energy loss value of the first motor phase is calculated, and a temperature estimation, in which a temperature of the first motor phase dependent on the first energy loss value is calculated as a first temperature value, and then by carrying out a second temperature calculation in order to estimate a temperature of the second motor phase, in which calculation a temperature of the second motor phase is calculated as a second temperature value in accordance with the first temperature value and an energy loss difference between the first and the second energy loss.

The computational effort required for monitoring the condition of the electric motor can be reduced. Overloading, for example heating of the components, for example the insulation or the potting, of the electric motor can be prevented. The reliability of the electric motor and the structural unit accommodating the electric motor, for example a hybrid module, can be improved.

The method makes it possible to detect a failure of the components of the electric motor, in particular when asymmetrical phase powers are present, and to increase the power limits of the electric motor in short-term operation and in continuous operation. The method enables a non-invasive temperature determination by including an estimation of the electrical power losses of the electric motor during operation of the electric motor, which can occur several times, in particular continuously. The electric motor can have smaller dimensions with the same power and take up a smaller installation space.

With the proposed method, the use of a plurality of temperature sensors is unnecessary. In addition, the use of temperature sensors in the particularly temperature-critical areas is not always possible due to the installation space.

Asymmetrical phase power can occur due to an asymmetrical energization of the electric motor at standstill or at low rotational speeds of the rotor, or also due to different electrical resistances of the motor phases of the electric motor. Asymmetrical phase power is based on asymmetrical phase losses, which in turn trigger asymmetrical phase temperatures. Such asymmetrical ratios between the motor phases can lead to an incorrect estimation of the temperature in one motor phase if only the temperature of one motor phase is monitored and is simply transferred to the other motor phases. For these reasons, a careful and precise estimation of the respective temperatures of the other motor phases should be aimed for.

The electric motor can be a brushless direct current motor. The electric motor can have a three-phase design. The electric motor can be installed in a powertrain of a vehicle. The powertrain can be a hybrid powertrain. The vehicle can be an electric vehicle. The electric motor can be a drive element of the vehicle.

The first and second motor phases can be associated with the stator and the temperature determination can estimate a temperature of the stator.

In an embodiment, there is a third motor phase to which a third energy loss is associated in the operating mode of the electric motor, wherein, during the second temperature calculation, a temperature is calculated on the third motor phase as the third temperature value dependent on the first temperature value and an energy loss difference between the first and third motor phases.

In another embodiment, the energy loss estimation calculates a line loss of the first motor phase dependent on a measurement of a first phase voltage, a first phase current and/or a phase frequency of the first motor phase in each case. The first motor phase can have an electrical line which has a temperature-dependent electrical line resistance. The electrical line can have a copper material, the specific electrical resistance of which is temperature-dependent. The line resistance can also be frequency-dependent, in particular due to skin effects and proximity effects. The line loss can be proportional to the product of the line resistance and the square of the phase current.

The electric motor can have permanent magnets and the line loss can furthermore depend on a magnetic field strength of the permanent magnets. The magnetic field strength can be temperature-dependent.

In another embodiment, the energy loss estimation calculates at least one iron loss of the electric motor at least dependent on a measurement of a rotational frequency of the rotor. The iron losses of the electric motor can be eddy current losses and/or hysteresis losses.

In another embodiment, the first energy loss value is dependent on the line loss and/or the iron loss.

In another embodiment, the temperature in the electric motor, in particular on the first motor phase or in a region of the first motor phase, is measured by a measurement as a temperature measurement value and the first temperature calculation takes into account the temperature measurement value when calculating the first temperature value.

In another embodiment, the calculation bases made for carrying out the first temperature calculation are adapted dependent on the first temperature value.

In another embodiment, during the second temperature calculation, the second temperature value is calculated dependent on the first temperature value and a temperature difference $\Delta\vartheta_2$.

In another embodiment, the existing thermal capacities are taken into account when calculating the second temperature value. This enables a more precise calculation of the transient temperatures.

In another embodiment, the temperature difference $\Delta\vartheta_2$ is proportional to the energy loss difference $\Delta P_2$. The proportionality factor can be a previously determined thermal resistance $R_{th,2}$. The thermal resistance $R_{th,2}$ can be between the first and second motor phases.

The temperature difference $\Delta\vartheta_i$ of each further motor phase m(i), in particular the temperature difference $\Delta\vartheta_2$ of the second motor phase m(2), can be calculated as follows based on the first motor phase m(1) as a reference phase and dependent on the energy loss difference $\Delta P_i$ between the respective motor phase m(i) and the first motor phase m(1)

$$\Delta\vartheta_i = R_{th,i} \cdot \Delta P_i \quad (1)$$

The energy loss difference is $$\Delta P_i = P_i - P_1 \quad (2)$$

and is mainly dependent on the line losses $P_l$ as follows $$\Delta P_i = P_{l,i} - P_{l,1} \quad (3)$$

The thermal resistance $R_{th,i}$ can be determined before the electric motor is operated, in particular before the electric motor is put into operation, for example during the development of the electric motor or after completion of the production of the electric motor. The thermal resistance $R_{th,i}$ can be determined via a calculation and/or measurement. The thermal resistance $R_{th,i}$ can be determined in advance dependent on a gradient from the temperature difference and the energy loss difference.

The energy loss differences $\Delta P_i$ that change over time between the first and second motor phases during operation can be taken into account when calculating the temperature difference $\Delta\vartheta_i$. The temperature difference $\Delta\vartheta_i$ can be calculated with the inclusion of these dynamic changes using a difference equation. Even with time-invariant energy losses or energy loss differences $\Delta P_i$, the thermal capacities result in dynamic temperature differences $\Delta\vartheta_i$ which can be calculated using a difference equation.

BRIEF DESCRIPTION OF THE DRAWINGS

Further advantages and advantageous embodiments result from the description of the figures and the drawings.

The method is described in detail below with reference to the drawings. Specifically.

DETAILED DESCRIPTION

Figure 1:
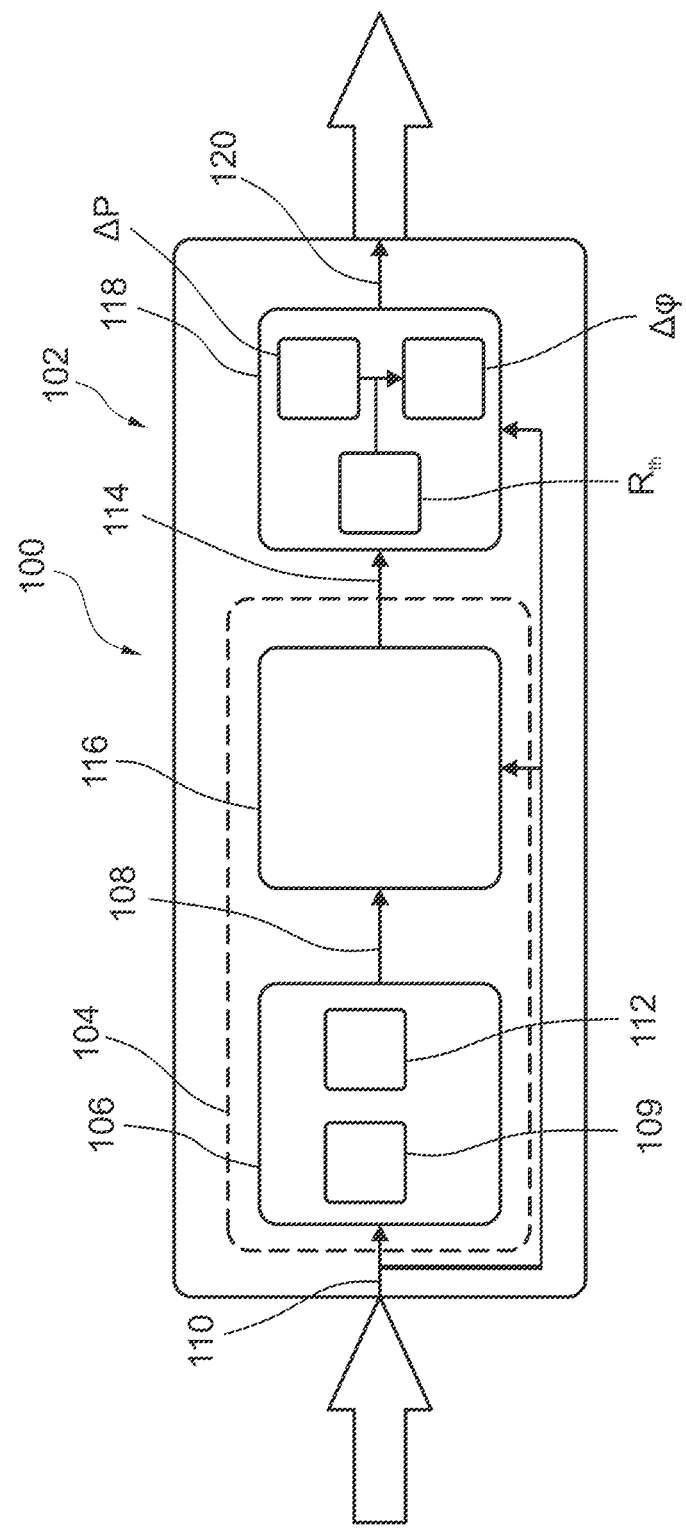
FIG. 1: shows a method for continuous condition monitoring of an electric motor.

FIG. 1 shows a method 100 for continuous condition monitoring of an electric motor. The electric motor has a stator, a rotatable rotor and, in particular, three motor phases which, by being supplied with electrical energy, cause a rotary motion of the rotor relative to the stator. In an operating mode of the electric motor, which is characterized, for example, by a certain speed and a certain load requirement, a first energy loss of electrical energy is associated with the first motor phase, a second energy loss of electrical energy is associated with the second motor phase and a third energy loss of electrical energy is associated with the third motor phase.

The condition monitoring of the electric motor comprises a temperature determination 102 which takes place during operation of the electric motor. First of all, a first temperature calculation 104 is carried out to estimate a temperature of the first motor phase. In the first temperature calculation 104, a first energy loss value 108 of an energy loss associated with the first motor phase is determined by an energy loss estimation 106. In this case, a line loss 109 of the first motor phase is calculated dependent on a measurement 110 of a first phase voltage, a first phase current and/or a phase frequency of the first motor phase in each case. Furthermore, an iron loss 112 of the electric motor is calculated at least dependent on a measurement 110 of a rotational frequency. The iron loss 112 of the electric motor may comprise eddy current losses and/or hysteresis losses.

In the first temperature calculation 104, a temperature of the first motor phase that is dependent on the first energy loss value 108 is also calculated as the first temperature value 114 by a temperature estimation 116. The temperature estimation 116 can also take into account a measurement 110 of a temperature in the electric motor, in particular at the first motor phase or in the area of the first motor phase, and correct and adapt the temperature model used in the temperature estimation 116 dependent thereon.

The first temperature value 114 is transferred to a subsequent second temperature calculation 118 for estimating a temperature of the second motor phase. During the second temperature calculation 118, a temperature of the second motor phase is calculated as a second temperature value 120 dependent on the first temperature value 114 and an energy loss difference $\Delta P$ between the first and second energy loss. The second temperature value 120 is calculated dependent on the first temperature value 114 and a temperature difference $\Delta\vartheta$. The temperature difference $\Delta D$ is proportional to the energy loss difference $\Delta P$. The proportionality factor is a previously determined thermal resistance between the first and second motor phases $R_{th}$.

Analogously to the estimation of the temperature of the second motor phase, during the second temperature calculation 118, a temperature of the third motor phase can also be calculated on the basis of the first temperature value 114 and an energy loss difference ΔP between the first and third energy loss. The temperature determination 102 that takes place during the operation of the electric motor can thus be simplified and the computational effort reduced.

Figure 2:
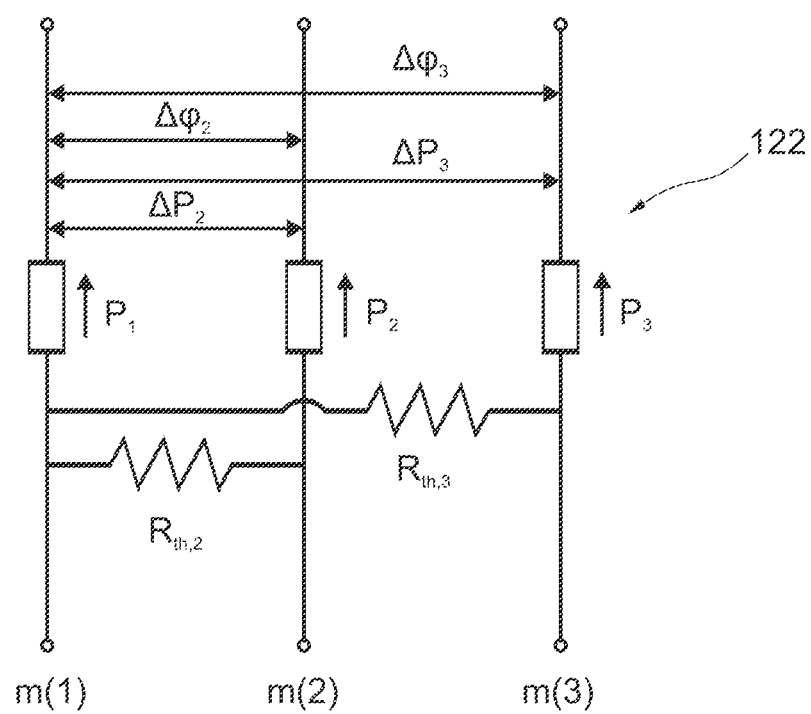
FIG. 2: shows a block diagram of an electric motor in which a method for continuous condition monitoring is applied.

FIG. 2 shows a block diagram of an electric motor 122 in which a method for continuous condition monitoring is used.

The electric motor 122 has a first motor phase m(1), a second motor phase m(2) and a third motor phase m(3). In the first temperature calculation, an energy loss $P_1$ of the first motor phase m(1) is estimated and a first energy loss value is thereby calculated. The first energy loss comprises a line loss 109 of the first motor phase m(1) and an iron loss 112 associated with the first motor phase m(1). By means of a subsequent temperature estimation carried out during the first temperature calculation, a first temperature value of the first motor phase m(1) is calculated dependent on the first energy loss value.

The temperature of the further motor phases m(i), here the second motor phase m(2) and the third motor phase m(3), can be calculated dependent on this first temperature value and a temperature difference $\Delta\vartheta_i$ between the respective motor phase m(i) and the first motor phase m(1). The respective temperature difference $\Delta\vartheta_i$ is calculated dependent on a determined energy loss difference $\Delta P_i$ between an energy loss $P_i$ of the respective motor phase m(i) and the energy loss $P_1$ of the first motor phase m(1) and a predetermined thermal resistance $R_{th,i}$ between the respective motor phase m(i) and the first motor phase m(1).

LIST OF REFERENCE SYMBOLS

100 Method
102 Temperature determination
104 First temperature calculation
106 Energy loss estimation
108 First energy loss value
109 Line loss
110 Measurement
112 Iron loss
114 First temperature value
116 Temperature estimation
118 Second temperature calculation
120 Second temperature value
122 Electric motor
m(1) First motor phase
m(2) Second motor phase
m(3) Third motor phase
$\Delta\vartheta$ Temperature difference
P Energy loss
ΔP Energy loss difference
$R_{th}$ Thermal resistance

The invention claimed is:

1. A method for continuous condition monitoring of an electric motor, the motor having a rotor, a stator, and a first motor phase and a second motor phase for inducing a rotary motion of the rotor relative to the stator, wherein,
in one operating mode of the electric motor, a first energy loss is associated with the first motor phase and a second energy loss is associated with the second motor phase,
the method comprising:
carrying out a first temperature calculation to estimate a temperature of the first motor phase, wherein the first temperature calculation incorporates an energy loss estimation, in which at least one first energy loss value of the first motor phase is calculated, and a temperature estimation, in which a temperature of the first motor phase dependent on the first energy loss value is calculated as a first temperature value, and then
carrying out a second temperature calculation to estimate a temperature of the second motor phase, in which calculation of a temperature of the second motor phase is based on the first temperature value and a temperature difference between the temperature of the first motor phase and the temperature of the second motor phase, in which the temperature difference is determined based on an energy loss difference between the first and the second energy loss.

2. The method according to claim 1, wherein there is a third motor phase, with which a third energy loss is associated in the operating mode of the electric motor, wherein a temperature of the third motor phase is calculated based on the first temperature value and an energy loss difference between the first and third motor phases.

3. The method according to claim 1, wherein the energy loss estimation includes calculation of a line loss of the first motor phase according to a measurement of a first phase voltage, a first phase current, or a phase frequency of the first motor phase.

4. The method according to claim 1, wherein the energy loss estimation includes calculation of at least one iron loss of the electric motor according to a measurement of a rotational frequency of the rotor.

5. The method according to claim 1, wherein the first temperature calculation is adapted according to a first temperature measurement.

6. The method according to claim 1, wherein the temperature difference is determined based additionally on a previously determined thermal resistance between the first and second motor phases.

7. The method according to claim 1, wherein calculation of the second temperature value takes into account existing thermal capacities.

8. A method for continuous condition monitoring of an electric motor, the method comprising:
estimating an energy loss of a first phase of the electric motor;
estimating a temperature of the first phase based on the estimate of energy loss of the first phase;
estimating an energy loss of a second phase of the electric motor;
determining a temperature difference between the temperature of the first phase and a temperature of the second phase based on a difference between the energy loss of the first phase and an energy loss of the second phase; and
estimating a temperature of a second phase of the electric motor based on the estimate of the temperature of the first phase and the temperature difference.

9. The method of claim 8 further comprising estimating a temperature of a third phase of the electric motor based on the estimate of the temperature of the first phase and an energy loss difference between the third phase and the first phase.

10. The method of claim 8 wherein estimating the energy loss of the first phase comprises:

estimating a line loss of the first phase; and estimating an iron loss of the first phase.

11. The method of claim 10 wherein the line loss of the first phase is estimated based on a measurement of a first phase voltage, a measurement of a first phase current, or a measurement of a phase frequency of the first phase.

12. The method of claim 10 wherein the iron loss of the first phase is estimated based on a measurement of a rotational frequency of a rotor.

13. The method of claim 10, the temperature difference based additionally on a previously determined thermal resistance between the first and second motor phases.

14. A method for continuous condition monitoring of an electric motor, the method comprising:

estimating an energy loss of a first phase of the electric motor;

estimating a temperature of the first phase based on the estimate of energy loss of the first phase;

estimating an energy loss of a second phase of the electric motor;

determining a temperature difference between the temperature of the first phase and a temperature of the second phase based on an energy loss difference between the second phase and the first phase and a thermal resistance between the first and second motor phases; and estimating the temperature of the second phase based on the estimate of the temperature of the first phase and the temperature difference.

15. The method of claim 14, further comprising adapting the estimate of the temperature of the first phase based on a first temperature measurement.

16. The method of claim 14, further comprising:

estimating an energy loss of a third phase of the electric motor;

determining a further temperature difference between the temperature of the first phase and a temperature of the third phase based on a further energy loss difference between the third phase and the first phase and a further thermal resistance between the first and third motor phases; and estimating the temperature of the third phase based on the estimate of the temperature of the first phase and the further temperature difference.

* * * * *